(12) United States Patent
Burkhart et al.

(10) Patent No.: US 10,006,541 B2
(45) Date of Patent: Jun. 26, 2018

(54) REGULATOR VALVE WITH INTEGRATED DIRECT ACTING SOLENOID

(71) Applicant: FORD GLOBAL TECHNOLOGIES, LLC, Dearborn, MI (US)

(72) Inventors: Robert O. Burkhart, Novi, MI (US); Derek Kinch, Ypsilanti, MI (US); John Butwin, Ann Arbor, MI (US); Anthony G. Koenings, Oakland, MI (US); Hrudaya Mahapatro, Canton, MI (US); Wei Zhuang, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 14/948,998

(22) Filed: Nov. 23, 2015

(65) Prior Publication Data

US 2016/0076642 A1     Mar. 17, 2016

Related U.S. Application Data

(60) Continuation-in-part of application No. 14/659,703, filed on Mar. 17, 2015, now Pat. No. 9,441,732, which is a division of application No. 13/192,807, filed on Jul. 28, 2011, now Pat. No. 9,010,374.

(51) Int. Cl.
*F16K 31/06* (2006.01)
*F16H 61/02* (2006.01)

(52) U.S. Cl.
CPC ..... *F16H 61/0276* (2013.01); *F16H 61/0251* (2013.01); *F16K 31/0613* (2013.01); *F16H 2061/0253* (2013.01); *F16H 2061/0279* (2013.01); *Y10T 137/8671* (2015.04); *Y10T 137/86614* (2015.04); *Y10T 137/86622* (2015.04)

(58) Field of Classification Search
CPC ......... F16K 31/0613; Y10T 137/86614; Y10T 137/86622; Y10T 137/87169; F16H 2061/0253; F16H 2061/0279
See application file for complete search history.

(56) References Cited

U.S. PATENT DOCUMENTS

| 4,100,519 | A |   | 7/1978  | Neff |   |
|-----------|---|---|---------|------|---|
| 4,611,631 | A |   | 9/1986  | Kosugi et al. |   |
| 4,617,967 | A | * | 10/1986 | Read ................... | F15B 13/0402 137/596.17 |
| 4,643,225 | A | * | 2/1987  | Imhof ................. | F15B 13/0402 137/596.17 |
| 4,860,792 | A | * | 8/1989  | Ichihashi ............ | F15B 13/0402 137/596.17 |
| 5,385,171 | A | * | 1/1995  | Cleasby .............. | F15B 13/0402 137/596.17 |

(Continued)

*Primary Examiner* — Kevin Murphy
(74) *Attorney, Agent, or Firm* — James Dottavio; MacMillan, Sobanski & Todd, LLC

(57) ABSTRACT

A control valve for an automatic transmission includes a valve body and a solenoid module. The body has a chamber, control pressure port, exhaust port, and reference surface. Metering edges are formed in the body at the control port. A spring transmits force between first and second spools in the chamber. The solenoid module has a pin for displacing the first spool and is located by contact with the reference surface. The solenoid module also has a first stop surface limiting pin movement and a second stop surface contacting the reference surface.

8 Claims, 4 Drawing Sheets

(56) References Cited

U.S. PATENT DOCUMENTS

| | | | |
|---|---|---|---|
| 5,911,245 A | 6/1999 | Weber | |
| 6,378,557 B2 * | 4/2002 | Kawamura | F16H 61/0251 |
| | | | 137/625.64 |
| 6,408,877 B2 * | 6/2002 | Venditti | F16K 31/0613 |
| | | | 137/596.17 |
| 6,408,883 B2 | 6/2002 | Motoki et al. | |
| 7,523,763 B2 | 4/2009 | Katsuta et al. | |
| 2006/0027269 A1 | 2/2006 | Neff et al. | |
| 2006/0065315 A1 | 3/2006 | Neff et al. | |
| 2015/0221427 A1 * | 8/2015 | Waterstredt | F16K 31/0675 |
| | | | 335/253 |

* cited by examiner

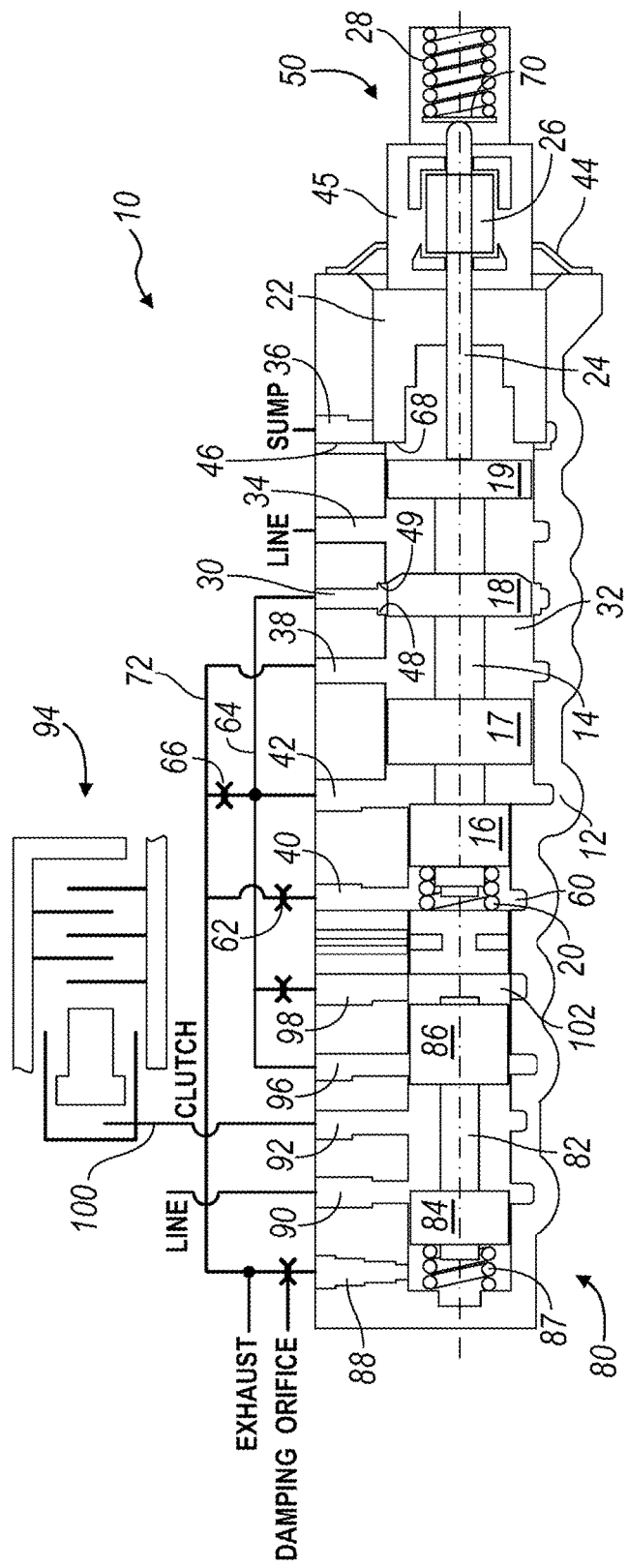
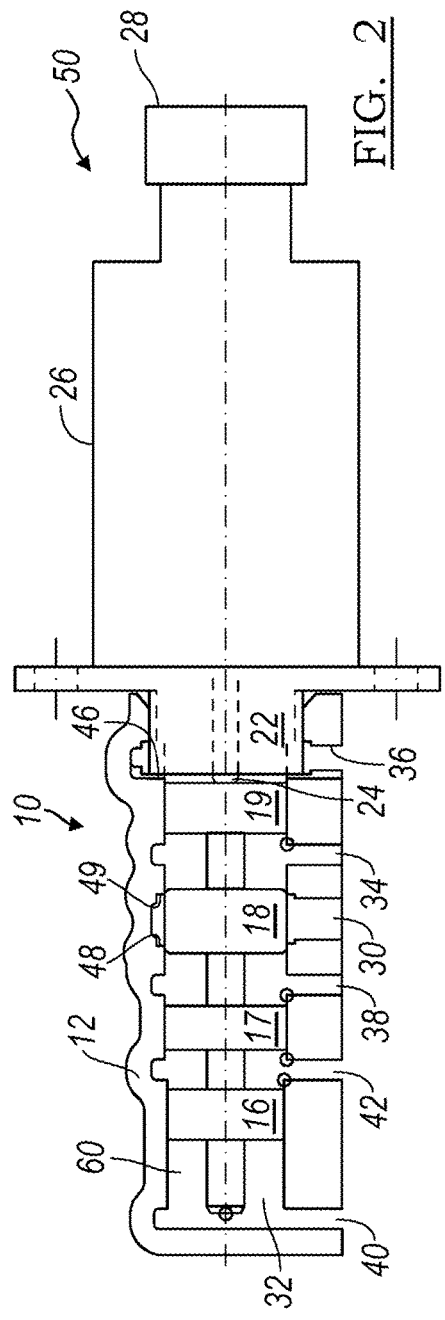
FIG. 1
FIG. 2

REGULATOR VALVE WITH INTEGRATED DIRECT ACTING SOLENOID

CROSS REFERENCE TO RELATED APPLICATIONS

The present patent application claims the benefit of and is a continuation in part of U.S. patent application Ser. No. 14/659,703, filed Mar. 17, 2015, which is a divisional of U.S. patent application Ser. No. 13/192,807, filed Jul. 28, 2011, both of which are incorporated herein by reference.

BACKGROUND OF THE INVENTION

Field of the Invention

This invention relates generally to a regulator spool valve controlled by a direct acting solenoid located in a machined main control casting of an automatic transmission.

Description of the Prior Art

An automatic transmission includes a hydraulic system for regulating fluid pressure and hydraulic fluid flow in various lines connected to components of the transmission. The system includes a regulator spool valve packaged in a main control casting, which is machined at a transmission production plant. The casting, preferably of an aluminum alloy, is usually referred to as a valve body. The components of the system are assembled in the valve body and have transfer functions characterized at the plant.

A solenoid-actuated shift valve controls pressure communicated from the valve to a clutch or brake whose state of engagement and disengagement determines the gear in which the transmission operates. But the dimensional tolerance stack-up in most valve body castings is too large to permit use of a practical integrated electromagnet and achieve required flow and pressure regulation accuracy.

A need exists in the industry for a regulator spool valve formed in a more compact valve body to reduce necessary package space.

SUMMARY OF THE INVENTION

An embodiment contemplates a control valve for an automatic transmission. The valve includes a valve body and a solenoid module. The body has a chamber, control pressure port, exhaust port, and reference surface. Metering edges are formed in the body at the control port. A spring transmits force between first and second spools in the chamber. The solenoid module has a pin for displacing the first spool and is located by contact with the reference surface. The solenoid module also has a first stop surface limiting pin movement and a second stop surface contacting the reference surface.

Another embodiment contemplates a control valve for an automatic transmission. The valve includes a valve body and a solenoid module. The body is a cast body having a chamber, control pressure port, exhaust port, and reference surface. Metering edges are formed in the body at the control port. First and second spools are displaceable along the chamber and lands on the first and second spools have equal outside diameters. A cavity in the first spool houses a spring. The spring transmits force between the first and second spools. The solenoid module has a pin for displacing the first spool and is located by contact with the reference surface. The solenoid module also has a first stop surface limiting pin movement and a second stop surface contacting the reference surface.

An advantage of an embodiment is a reduction in necessary package space for the control valve.

BRIEF DESCRIPTION OF THE DRAWINGS

The invention will be more readily understood by reference to the following description, taken with the accompanying drawings, in which:

FIG. 1 is a schematic showing a cross section of a Meter Out-Meter In (MOMI) casting-integrated direct acting solenoid valve with latch valve;

FIG. 2 is a cross section of the casting-integrated direct acting solenoid of FIG. 1;

DETAILED DESCRIPTION

Figure 3:
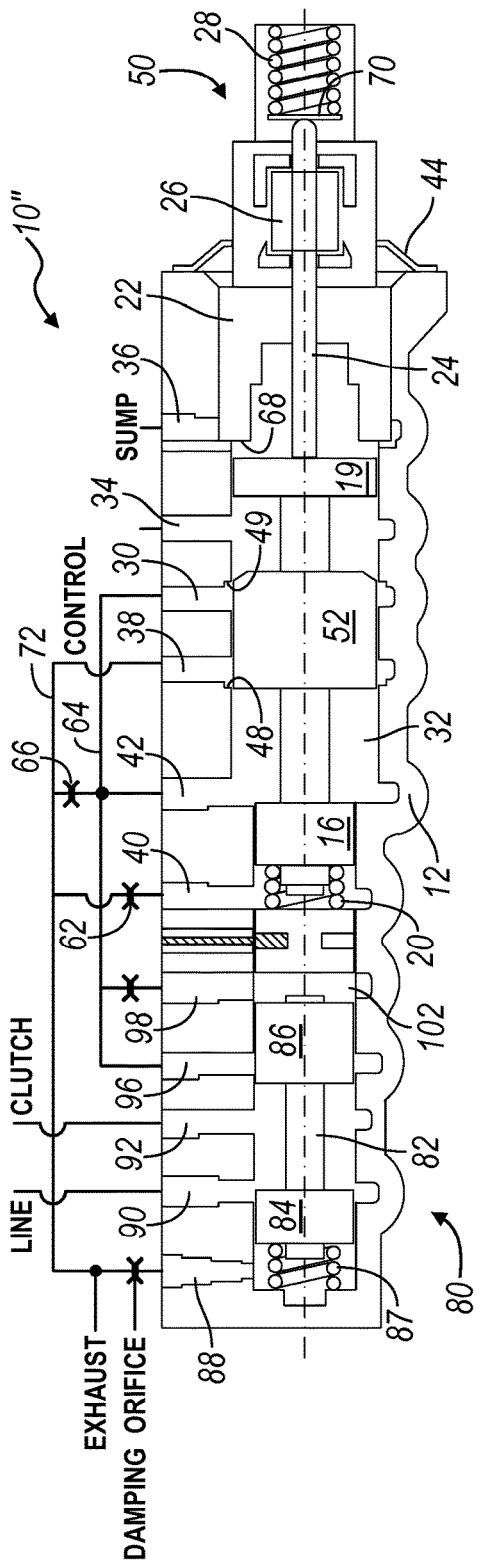
FIG. 3 is a schematic showing a casting-integrated direct acting solenoid valve showing a Meter Out-Meter Out (MOMO) configuration.

The casting-integrated, direct acting solenoid hydraulic valve 10 shown in FIGS. 1 and 2 includes a valve body 12 formed of cast metal, preferably an aluminum alloy. The valve body 12 contains a valve spool 14, formed with lands 16-19; an optional compression spring 20 urging the spool rightward; an armature pin 24 contacting the spool; an electromagnetic solenoid 26, which actuates the pin to move leftward when the solenoid is energized and allows the spool to move rightward when the solenoid is deenergized; and a second optional compression spring 28 biasing the pin leftward.

Preferably spring 20 has a relatively low spring constant to make most use of available force from electromagnetic solenoid 26.

The valve body 12 is formed with control ports 30, 42 through which control pressure communicates with the chamber 32 containing the spool 14; a line pressure port 34, through which line pressure communicates with the chamber; sump port 36, through which hydraulic fluid flows from the chamber to a low pressure sump; and an exhaust ports 38, 40, through which the chamber communicates with a low pressure source.

Adapter 22 or snout is continually held in contact with an installation datum or reference surface 46 formed in sump port 36 by the elastic force produced by a resilient clip 44, which is secured to the outer surface of a housing 45 that encloses the solenoid 26.

A single tool concurrently machines both of the metering edges 48, 49 and the installation datum or reference surface 46 in the valve body. The solenoid module 50 includes adapter 22 or snout, solenoid 26, housing 45 and spring 28.

All edges that requiring precise relative positions are cut in a single operation for improved tolerances and manufacturing efficiency. Metering edges are precision machined rather than cast for improved edge quality, location accuracy, and zero draft. High precision tolerances enable close control of leakage and pressure regulation accuracy. Close tolerances enable flow control with a short stroke solenoid module 50.

In operation, valve 10 regulates control pressure in port 30 and feedback pressure in port 42 by producing a first sum of the force of optional spring 20 and the rightward net force due to control pressure in port 42 acting on the differential areas of lands 16 and 17. Balancing the first sum of forces is a second sum of leftward forces comprising the force of the solenoid-actuated pin 24 and the force of spring 28. As the force of pin 24 increases, valve 10 opens a connection through metering edge 49 between line pressure in port 34 and control pressure in ports 30, 42. As metering edge 49 open, control pressure increases. When control pressure increases sufficiently for the current position of pin 24, the differential feedback control pressure on lands 16, 17 causes the metering edge 49 to close and metering edge 48 to open a connection between control pressure port 30 and to the low pressure exhaust through chamber 32, exhaust port 38 and passage 72.

A single metering control pressure port 30 at spool land 18 (Meter Out-Meter In, as shown in FIG. 1) or a dual metering control pressure ports 30, 38 at spool land 52 (Meter Out-Meter Out, as shown FIG. 3) can be accommodated with no change in tolerances. A clear division of tolerance responsibility is established for the electromagnet and hydraulic manufacturing groups.

In FIG. 2 the diameter of control land 17 is larger than the diameter of land 16 of valve 10. The diameter of land 16 of valve 10 defines a large diameter spool end damper 60 for enhancing stability, permitting use of a relatively large diameter, contamination resistant damper orifice 62. Damper 60 is formed outside of the feedback path 64 for minimum feedback lag and improved stability. The diameter of damper 60 is large relative to the difference in diameter of the lands 16 and 17.

The large diameter of spool land 18 combined with flow notches enables high flow with a short stroke magnet as well as the preferred manufacturing technique.

The valves shown in FIGS. 1-3 enable standard main control (multi-bore including worm trail) configurations while providing magnet interface tolerances.

A control pressure bleed orifice 66 provides for spool position control and stability. Tracking response is improved with no dead-zone to cross. Low frequency hunting across the dead-zone is also prevented.

Tight machining tolerances allow for minimized overlap reducing dead band.

The axial surface 68 of adapter 22 or snout is located in chamber 32 due to contact with reference surface 46 such that, when solenoid 26 is deenergized and spool 14 moves rightward in the chamber, land 19 contacts surface 68 before the armature pin 24 contacts a stop surface 70 in the solenoid module, thereby preventing spring 28 from becoming fully compressed due to contacts among its coils. In this way, the spool end feature provides positive stop for forced over travel protection of the solenoid module 50.

Damping chamber 60 is provided with an oil reservoir using an elevated vent 66 and fed from the control pressure bleed orifice 66.

The casting-integrated, direct acting solenoid configuration 10 (10" in FIG. 3), includes a latch valve 80 formed in the valve body 12 of cast metal. Valve 80 includes a spool 82, formed with lands 84, 86; a compression spring 87 urging spool 82 rightward; exhaust port 88; line port 90, connected to a source of line pressure whose magnitude is substantially constant; an outlet port 92, through which a clutch or brake 94 of the transmission is actuated; a control port 96 communicating through passage 64 with control pressure ports 30, 42 of valve 10 (10" in FIG. 3); and a control pressure feedback port 98 also communicating through passage 64 with control pressure ports 30, 42 of valve 10 (10" in FIG. 3).

In operation, valve 80 supplies actuating pressure through line 100 to the cylinder 102 of a hydraulic servo that actuate the transmission control element 94. When control pressure is relatively low, spring 87 forces spool 82 to the right-hand end of the chamber, thereby closing line port 90, opening control port 96 and communicating fluid at control pressure to the control element 94 through outlet port 92 and line 100. As control pressure increases, spool 82 moves axially leftward along the valve chamber due to a force produced by control pressure in feedback port 98 acting in opposition to the force of spring 87. Land 86 gradually closes port 96, and land 84 maintains line port 90 closed. As control pressure increases further, land 86 closes control port 96, and land 84 opens a connection between line port 90 and the control element 94, thereby latching valve 80 and engaging control element 94 using line pressure, which is typically significantly higher than the maximum regulated pressure of the valve 10 (10" in FIG. 3). If control pressure increases further after valve 80 is latched, line pressure alone is applied to fully engage the control element 94. After the control element 94 becomes fully engaged, line pressure can be reduced to improve efficiency. The spool 14 of regulating valve 10 is maintained in its regulating position while valve 80 is latched.

Valve 80 is delatched by reducing control pressure, which causes land 84 to close line port 90, and land 86 to reopen a connection between control port 96 and the transmission control element 94 through outlet port 92 and line 100.

Figure 4:
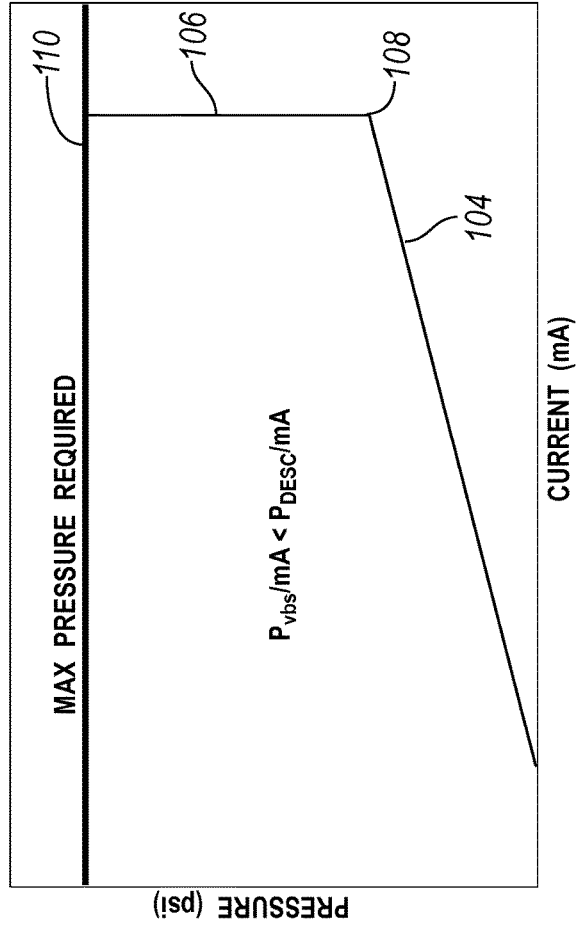
FIG. 4 is a graph showing the variation of outlet pressure in response to current FIG. 5 includes graphs of delatch pressure and regulating spool position while the latch valve is delatched.

FIG. 4 shows the variation of outlet pressure in port 92 in response to current in solenoid 26. The first portion of the relation occurs as control pressure is increased while control port 96 is connected to outlet port 92 and line port is closed. The second portion 106 occurs after point 108 where control port 96 closes and constant line pressure through port 90 opens to outlet port 92 fully engaging the control element at 110.

The feedback chamber 102 of valve 80 is not exhausted when valve 80 is latched, thereby eliminating the possibility of entrapping air in the lines feeding control element 94. Because the feedback chamber 102 of valve 80 is not exhausted when valve 80 is latched, those lines need not be refilled when valve 80 is delatched.

Figure 5:
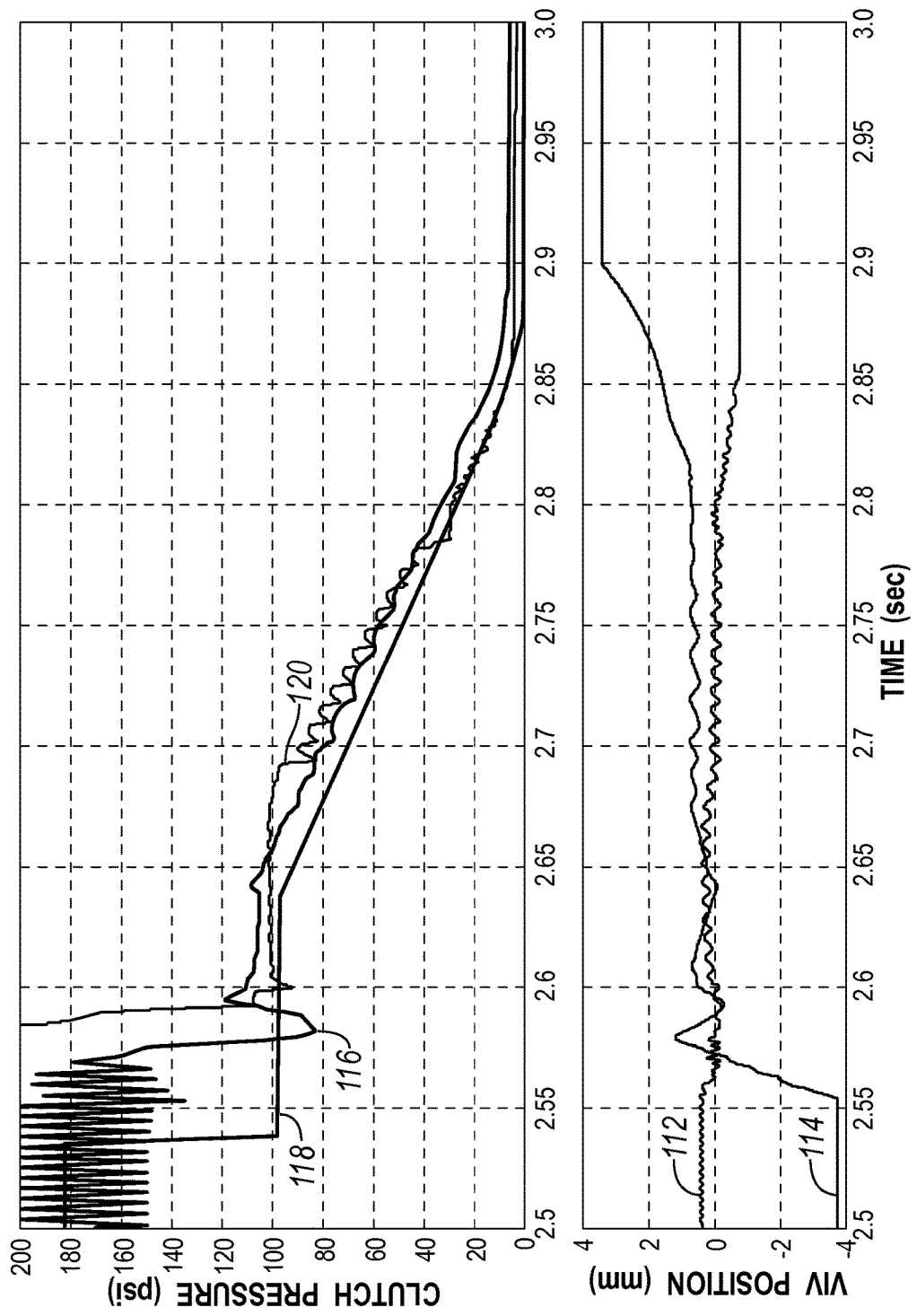

The regulator valve 10 and latch valve 80 in combination provide functional advantages in transition states of clutch control by performing the latch transition away from the regulation control. As FIG. 5 shows, upon delatching valve 80, the position 112 of spool 14 of the regulator valve 10 remains in a control metering position because its output pressure controls the actuating event and provides superior transition regulation compared to a VBS-regulator-latch valve system 114.

A VBS-regulator-latch system commonly experiences pressure undershoots 116 past the desired delatch pressure 118, whereas the delatch pressure transient 120 produced by the combination of valves 10, 80 closely tracks the desired delatch pressure 118 with virtually no overshoot.

Figure 6:
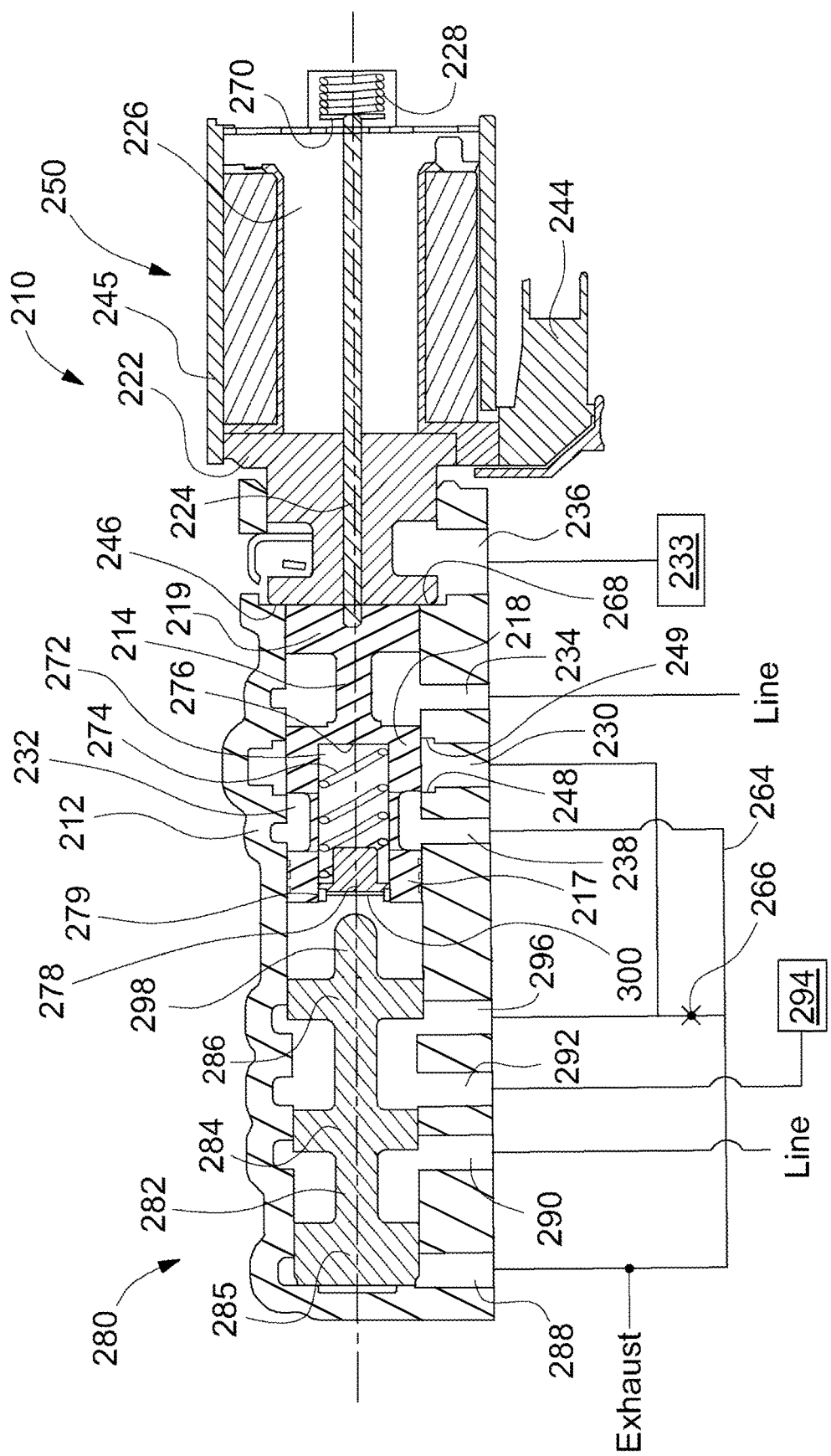
FIG. 6 is a schematic showing a second embodiment of a Meter Out-Meter In (MOMI) casting-integrated direct acting solenoid valve with latch valve.

Referring now to FIG. 6, there is illustrated a direct acting solenoid hydraulic valve 210 that is a variation of the valve 10. The valve 210 includes a valve body 212 formed of cast metal, preferably an aluminum alloy. The valve body 212 contains a valve spool 214, formed with lands 217, 218, and 219; an armature pin 224 contacting the spool 214; an electromagnetic solenoid 226, which actuates the pin 224 to move leftward when the solenoid 226 is energized and allows the spool 214 to move rightward when the solenoid is de-energized; and an optional compression spring 228 biasing the pin leftward. A stop surface 270 is between the pin 224 and the spring 228.

The valve body 212 is formed with control port 230, through which control pressure communicates with the chamber 232 containing the spool 214; a line pressure port 234, through which line pressure communicates with the chamber 232; sump port 236, through which hydraulic fluid flows from the chamber 232 to a low pressure sump 233; and an exhaust port 238, through which the chamber 232 communicates with a low pressure source. The spool 214 is displaceable along the chamber 232.

Adapter or snout 222 is continually held in contact with an installation datum or reference surface 246, formed in sump port 236, by the elastic force produced by a resilient clip 244. The clip 244 is secured to the outer surface of a housing 245 that encloses the solenoid 226.

A single tool concurrently machines both of the metering edges 248, 249 and the installation datum or reference surface 246 in the valve body 212. The solenoid module 250 includes the adapter 222, solenoid 226, housing 245, and spring 228.

All edges that require precise relative positions—e.g., the metering edges 248, 249 and the reference surface 246—are cut in a single operation for improved tolerances and manufacturing efficiency. Metering edges are precision machined rather than cast for improved edge quality, location accuracy, and zero draft. High precision tolerances enable close control of leakage and pressure regulation accuracy. Close tolerances enable flow control with the short stroke solenoid module 250.

The valve 210 enables standard main control (multi-bore including worm trail) configurations while providing magnet interface tolerances.

A control pressure bleed orifice 266 provides for spool position control and stability. Tracking response is improved with no dead-zone to cross. Low frequency hunting across the dead-zone is also prevented.

Tight machining tolerances allow for minimized overlap reducing dead band.

The axial surface 268 of adapter 222 is located in chamber 232 due to contact with reference surface 246 such that, when solenoid 226 is de-energized and spool 214 moves rightward in the chamber 232 due to residual control pressure and pressure leakage flow across the land 219, land 219 contacts surface 268 before the spring 228 is fully compressed. In this way, the spool end feature provides positive stop for forced over travel protection of the solenoid module 250.

The spool 214 has a cavity 272 containing a spring 274. The cavity 272 is open to the chamber 232. The spring is held between an end face 276 and a cap 278. The cap 278 preloads the spring 274 and is secured across in the cavity 272 by a snap ring 279.

The casting-integrated, direct acting solenoid configuration 210 includes a latch valve 280 formed in the chamber 232 of cast metal. Valve 280 includes a spool 282, formed with lands 284, 285, and 286; exhaust port 288; line port 290, connected to a source of line pressure whose magnitude is substantially constant; an outlet port 292, through which a transmission control element 294 of the transmission is actuated; and a control port 296 communicating through passage 264 with control pressure port 230 of valve 210. The transmission control element 294 may be a clutch or brake. Lands 284, 285, and 286 each have an outside diameter equal to an outside diameter of each of lands 217, 218, and 219. The spool 282 is displaceable along the chamber 232.

In operation, valve 210 regulates control pressure in port 230 by a sum of leftward forces comprising the force of the solenoid-actuated pin 224 and the force of spring 228. The sum of leftward forces moves the spool 214 leftward in FIG. 6. As the force applied to pin 224 increases, valve 210 opens a connection through metering edge 249 between line pressure in port 234 and control pressure in port 230.

In operation, valve 280 supplies actuating pressure from control port 230 through a line to port 292 via port 296 to actuate the transmission control element 294. As pressure increases in port 230, pressure also increases in port 296. Differential pressure on lands 284 through 286 moves spool 282 rightward in FIG. 6.

The spool 214 moves leftward and the spool 282 moves rightward until a tip 298 of the spool 282 contacts an end face 300 of the cap 278. The spring 274 produces a spring force as a function of a spring constant for the spring 274. When the tip 298 contacts the end face 300, the spring force resists further rightward movement of the spool 282 while pressure continues to increase in port 296.

When the pressure in port 296 exceeds the spring force, the spring 274 compresses. As the spring 274 compresses, the cap 278 and spool 282 begin moving rightward again until the land 286 contacts and abuts the land 217. Force is transmitted between the spools 214, 282 when the lands 217, 286 contact each other.

The movement of the spool 282 into the cavity 272 opens a connection between line port 290 and the control element 294, thereby latching valve 280 and engaging control element 294 using line pressure. The pressure at which latching occurs may be tuned by adjusting the spring constant of the spring 274. Typically, line pressure is significantly higher than the maximum regulated pressure of the valve 210. If control pressure increases further after valve 280 is latched, line pressure alone is applied to fully engage the control element 294. After the control element 294 becomes fully engaged, line pressure can be reduced to improve efficiency.

The latch valve 280 is unlatched by reducing a pressure command current to the solenoid 226—i.e., de-energizing the solenoid 226, which causes the spool 214 to move rightward, away from the spool 282 and closing the port 230. With control pressure decreasing, pressure at the port 296 also decreases. When control pressure is less than the spring force of the spring 274, the spring 274 pushes the spools 214 and 282 apart such that the spool 282 moves leftward. As the spool 282 moves leftward, port 290 closes and the port 296 reopens such that the valve 280 is unlatched.

In accordance with the provisions of the patent statutes, the preferred embodiment has been described. However, it should be noted that the alternate embodiments can be practiced otherwise than as specifically illustrated and described.

The invention claimed is:

1. A valve, comprising:
 a body including a chamber, control port, exhaust port, and reference surface;
 metering edges formed in the body at the control port;
 a spring transmitting force between first and second spools in the chamber;
 a solenoid module, located by contact with the reference surface, including a pin for displacing the first spool, a first stop surface limiting pin movement, and a second stop surface contacting the reference surface;
 a cavity in the first spool, wherein the cavity houses the spring;

a cap holding the spring in the cavity; and a snap ring securing the cap to the first spool and preloading the spring.

2. The valve of claim 1 wherein the first and second spools displace along the chamber.

3. The valve of claim 1 wherein, when the spring is compressed, a first land of the first spool abuts a second land of the second spool.

4. The valve of claim 1 wherein lands on the first and second spools have equal outside diameters.

5. The valve of claim 1 further comprising:

a land on the first spool, wherein a first edge of the metering edges is located on a first axial side of the control port and a second edge of the metering edges is located on a second axial side of the control port, opposite the first axial side;

a line pressure port in the body and communicating with a source of line pressure to the chamber, wherein the land opens a connection between the control port and the line pressure port across the first edge.

6. The valve of claim 1 further comprising:

a land on the first spool, wherein the land opens and closes communication between the chamber and the control port across the metering edges.

7. The valve of claim 1 further comprising:

a land on the second spool, wherein the land opens and closes communication between an outlet port and a second control port and between the outlet port and a second line pressure port, wherein the outlet port is connected to a transmission control element.

8. The valve of claim 1 further comprising:

an adapter formed with the second stop surface contacting the reference surface.

* * * * *